(12) United States Patent
Murao (10) Patent No.: US 9,130,973 B2
(45) Date of Patent: *Sep. 8, 2015

(54) LONG-TERM SIGNATURE TERMINAL, LONG-TERM SIGNATURE SERVER, LONG-TERM SIGNATURE TERMINAL PROGRAM, AND LONG-TERM SIGNATURE SERVER PROGRAM

(75) Inventor: Shinichi Murao, Chiba (JP)

(73) Assignee: SEIKO INSTRUMENTS INC. (JP)

( * ) Notice: Subject to any disclaimer, the term of this patent is extended or adjusted under 35 U.S.C. 154(b) by 190 days.

This patent is subject to a terminal disclaimer.

(21) Appl. No.: 13/985,584

(22) PCT Filed: Dec. 8, 2011

(86) PCT No.: PCT/JP2011/078448
§ 371 (c)(1),
(2), (4) Date: Aug. 15, 2013

(87) PCT Pub. No.: WO2012/114602
PCT Pub. Date: Aug. 30, 2012

(65) Prior Publication Data
US 2013/0326225 A1    Dec. 5, 2013

(30) Foreign Application Priority Data
Feb. 23, 2011 (JP) ................................. 2011-037381

(51) Int. Cl.
*H04L 29/06* (2006.01)
*H04L 9/32* (2006.01)
*G06F 21/64* (2013.01)

(52) U.S. Cl.
CPC .............. *H04L 63/123* (2013.01); *G06F 21/64* (2013.01); *H04L 9/3247* (2013.01); *H04L 9/3297* (2013.01); *H04L 2209/68* (2013.01)

(58) Field of Classification Search
CPC ....... G06F 21/64; G06F 21/83; H04L 9/3247; H04L 9/0825; H04L 63/123; H04L 9/3297; H04L 9/3294
See application file for complete search history.

(56) References Cited

U.S. PATENT DOCUMENTS 6,367,013 B1 *  4/2002  Bisbee et al. ................. 713/178
6,367,913 B1 *  4/2002  Anderson ....................... 347/43

(Continued)

OTHER PUBLICATIONS

International Search Report mailed Feb. 7, 2012 issued in International Appln. No. PCT/JP2011/078448.
Patent Abstracts of Japan, Publication No. 2005-142661, publication date Jun. 2, 2005.

*Primary Examiner* — Harunur Rashid
*Assistant Examiner* — Sher Khan
(74) *Attorney, Agent, or Firm* — Adams & Wilks (57) ABSTRACT

A long-term signature terminal acquires storage-target data and electronic signature data corresponding to the acquired storage-target data. The acquired electronic signature data is transmitted to a server, and electronic signature data having a time stamp applied thereto is received from the server. The received electronic signature data with the applied time stamp is combined with the acquired storage-target data to generate signed data. Verification information for verifying the validity of the electronic signature data having the time stamp is received from the server and applied to the signed data to generate first long-term signature data. Confirmation data for confirming unfalsification of the generated long-term signature data is generated and transmitted to the server, and the confirmation data having a time stamp applied thereto is received from the server. The received confirmation data with the time stamp is applied to the first long-term signature data to generate second long-term signature data.

5 Claims, 5 Drawing Sheets

(56) References Cited

U.S. PATENT DOCUMENTS

| | | | |
|---|---|---|---|
| 6,584,565 B1 * | 6/2003 | Zamek | 713/156 |
| 8,635,442 B2 * | 1/2014 | Agrawal | 713/155 |
| 2003/0233552 A1 * | 12/2003 | Baldwin et al. | 713/176 |
| 2005/0102499 A1 * | 5/2005 | Kosuga et al. | 713/152 |
| 2006/0206712 A1 * | 9/2006 | Dillaway et al. | 713/176 |

* cited by examiner

(c)
PAdEs(1st)

(d)
PAdEs(2nd)

FIG.3

FIG.4

LONG-TERM SIGNATURE TERMINAL, LONG-TERM SIGNATURE SERVER, LONG-TERM SIGNATURE TERMINAL PROGRAM, AND LONG-TERM SIGNATURE SERVER PROGRAM

BACKGROUND OF THE INVENTION

1. Technical Field

The present invention relates to a long-term signature terminal, a long-term signature server, a long-term signature terminal program, and a long-term signature server program, and for example, to a technique for creating long-term signature data.

2. Background Art

In order to certify unfalsification (authenticity) of electronic data, an electronic signature is widely used in which electronic data is encrypted with a secret key to perform the electronic signature, and then electronic data is decrypted with a public key corresponding to the secret key to verify the electronic signature.

Electronic data is decrypted with the public key, and thus it can be confirmed that electronic data is encrypted with the secret key corresponding to the public key. However, since a signatory has the secret key, it can be certified that electronic data is generated by the signatory. For example, the secret key functions as a seal, and the public key functions as a certificate of the seal.

The public key is distributed by a public key certificate which is issued by a certificate authority, and when the public key is distributed, the authenticity of the public key can be confirmed by the certificate.

Meanwhile, the electronic signature has an expiration date which is set so as to cope with a compromise or the like of an encryption algorithm used in the signature or the like.

Even before the expiration date, the electronic signature may be expired according to signatory's convenience or all certificates following a root certificate may be expired if the secret key is omitted.

Accordingly, in order to cope with the above-described problem, as in PTL 1, an electronic signature format (hereinafter, referred to as long-term signature format) for perpetuating the validity of an electronic signature is specified.

In the long-term signature format, a document time stamp which is a time stamp having an expiration date longer than an electronic signature is applied to electronic data to be stored and the electronic signature, thereby securing the legitimacy of the electronic data even after the expiration date of the electronic signature has elapsed.

Before the expiration date of the document time stamp elapses, a second-generation document time stamp having an expiration date longer than the document time stamp is applied to extend the expiration date. Hereinafter, the expiration date is extended to the third-generation, the fourth-generation, etc., making it possible to verify unfalsification of electronic data over a long period of time.

In the related art, however, in order to receive a long-term signature service, a user needs to deliver his/her secret key for use in an electronic signature or original data of electronic data to a long-term signature service provider, and there is a problem in that confidential information (secret key and original data) should be sent to the outside.

Otherwise, when the user performs a long-term signature without receiving the long-term signature service, there is a need for constructing a long-term signature system on the user side and for performing operation, such as certificate management, time stamp acquisition, and expiration information acquisition.

CITATION LIST

Patent Literature

[PTL 1] JP-T-2003-533940

SUMMARY OF THE INVENTION

An object of the invention is to perform a long-term signature while retaining confidential information on the user side.

In order to attain the above-described object, according to a first aspect of the invention, a long-term signature terminal includes storage-target data acquisition means for acquiring storage-target data, electronic signature data acquisition means for acquiring electronic signature data of the acquired storage-target data, electronic signature data reception means for transmitting the acquired electronic signature data to a predetermined server and receiving electronic signature data having a time stamp applied thereto from the predetermined server, signed data generation means for combining the received electronic signature data having the time stamp applied thereto with the acquired storage-target data to generate signed data, long-term signature data generation means for receiving verification information for verifying the validity of the electronic signature data having the time stamp applied thereto from a predetermined server to apply the verification information to the signed data and generating long-term signature data, confirmation data reception means for generating confirmation data for confirming unfalsification of the generated long-term signature data, transmitting the confirmation data to a predetermined server, and receiving the confirmation data having a time stamp applied thereto from the predetermined server, and long-term signature data generation means for applying the received confirmation data having the time stamp applied thereto to the long-term signature data to generate long-term signature data.

According to a second aspect of the invention, the long-term signature terminal according to the first aspect of the invention further includes division means for dividing the acquired storage-target data into first data and second data, in which the signed data generation means combines the acquired electronic signature data between the first data and the second data.

According to a third aspect of the invention, in the long-term signature terminal according to the first or second aspect of the invention, at least two of the electronic signature data reception means, the long-term signature data generation means, and the confirmation data reception means perform communication with the same server.

According to a fourth aspect of the invention, a long-term signature server includes electronic signature data time stamp request means for receiving electronic signature data from a long-term signature terminal generating long-term signature data for storage-target data and transmitting a time stamp request of the electronic signature data to a time stamp server, electronic signature data transmission means for receiving a time stamp transmitted from the time stamp server for the time stamp request of the electronic signature data and applying the received time stamp to the electronic signature data to transmit the electronic signature data having the time stamp applied thereto to the long-term signature terminal, verification information transmission means for collecting verification information for verifying the validity of the electronic signature data having the time stamp applied thereto and transmitting the verification information to the long-term signature terminal, confirmation data time stamp request means for receiving confirmation data for confirming unfalsification of long-term signature data generated by the long-term signature terminal using the storage-target data, the electronic signature data having the time stamp applied thereto, and the transmitted verification information from the long-term signature terminal and transmitting a time stamp request of the confirmation data to a time stamp server, and confirmation data transmission means for receiving a time stamp transmitted from the time stamp server for the time stamp request of the confirmation data, applying the received time stamp to the confirmation data, and transmitting the confirmation data having the time stamp applied thereto to the long-term signature terminal.

According to a fifth aspect of the invention, a long-term signature terminal program causes a computer to realize a storage-target data acquisition function of acquiring storage-target data, an electronic signature data acquisition function of acquiring electronic signature data of the acquired storage-target data, an electronic signature data reception function of transmitting the acquired electronic signature data to a predetermined server and receiving electronic signature data having a time stamp applied thereto from the predetermined server, a signed data generation function of combining the received electronic signature data having the time stamp applied thereto with the acquired storage-target data to generate signed data, a long-term signature data generation function of receiving verification information for verifying the validity of the electronic signature data having the time stamp applied thereto from a predetermined server to apply the verification information to the signed data and generating long-term signature data, a confirmation data reception function of generating confirmation data for confirming unfalsification of the generated long-term signature data, transmitting the confirmation data to a predetermined server, and receiving the confirmation data having a time stamp applied thereto from the predetermined server, and a long-term signature data generation function of applying the received confirmation data having the time stamp applied thereto to the long-term signature data to generate long-term signature data.

According to a sixth aspect of the invention, a long-term signature server program causes a computer to realize an electronic signature data time stamp request function of receiving electronic signature data from a long-term signature terminal generating long-term signature data for storage-target data and transmitting a time stamp request of the electronic signature data to a time stamp server, an electronic signature data transmission function of receiving a time stamp transmitted from the time stamp server for the time stamp request of the electronic signature data and applying the received time stamp to the electronic signature data to transmit the long-term signature terminal, a verification information transmission function of collecting verification information for verifying the validity of the electronic signature data having the time stamp applied thereto and transmitting the verification information to the long-term signature terminal, a confirmation data time stamp request function of receiving confirmation data for confirming unfalsification of long-term signature data by the long-term signature terminal using the storage-target data, the electronic signature data having the time stamp applied thereto, and the transmitted verification information from the long-term signature terminal and transmitting a time stamp request of the confirmation data to a time stamp server, and a confirmation data transmission function of receiving a time stamp transmitted from the time stamp server for the time stamp request of the confirmation data, applying the received time stamp to the confirmation data, and transmitting the confirmation data having the time stamp applied thereto to the long-term signature terminal.

According to the invention, since elements necessary for the long-term signature are created by the server while retaining the confidential information on the user side, it is possible to perform the long-term signature while retaining the confidential information on the user side, and to reduce a system operation load relating to certificate management, time stamp acquisition, and expiration information acquisition.

DETAILED DESCRIPTION OF THE INVENTION (1) Outline of Embodiment

A client terminal 3 (FIG. 1) can generate PAdES while performing communication with a long-term signature server 2 without delivering a PDF document and a secret key for use in an electronic signature to a long-term signature server 2. PAdES is a long-term signature format which is specified for a PDF file.

As shown in FIG. 2(c), PAdES is constituted by a signed PDF document in which CAdES (an electronic signature with a time stamp) is embedded between PDF documents A and B divided from a PDF document, verification information for verifying the electronic signature or the time stamp, and a document time stamp (DTS) issued for the signed PDF document and the verification information, and is created in the following manner.

First, the client terminal 3 transmits CAdES with an electronic signature before time stamp issuance to the long-term signature server 2 to request to issue a time stamp to CAdES.

Otherwise, hash value data necessary for a time stamp may be computed for CAdES with the electronic signature before time stamp issuance, and only the hash value may be transmitted to the long-term signature server 2.

Accordingly, the client terminal 3 can acquire CAdES from the long-term signature server 2 while retaining the PDF document and secret key, and can create a signed PDF document.

Next, the client terminal 3 requests the long-term signature server 2 to collect verification information, acquires the verification information, further generates information for confirming unfalsification of the signed PDF document and the verification information, and transmits the information to the long-term signature server 2 to request to generate DTS.

The client terminal 3 acquires the signed PDF document, the verification information, and DTS to generate PAdES.

(2) Details of Embodiment

Figure 1:
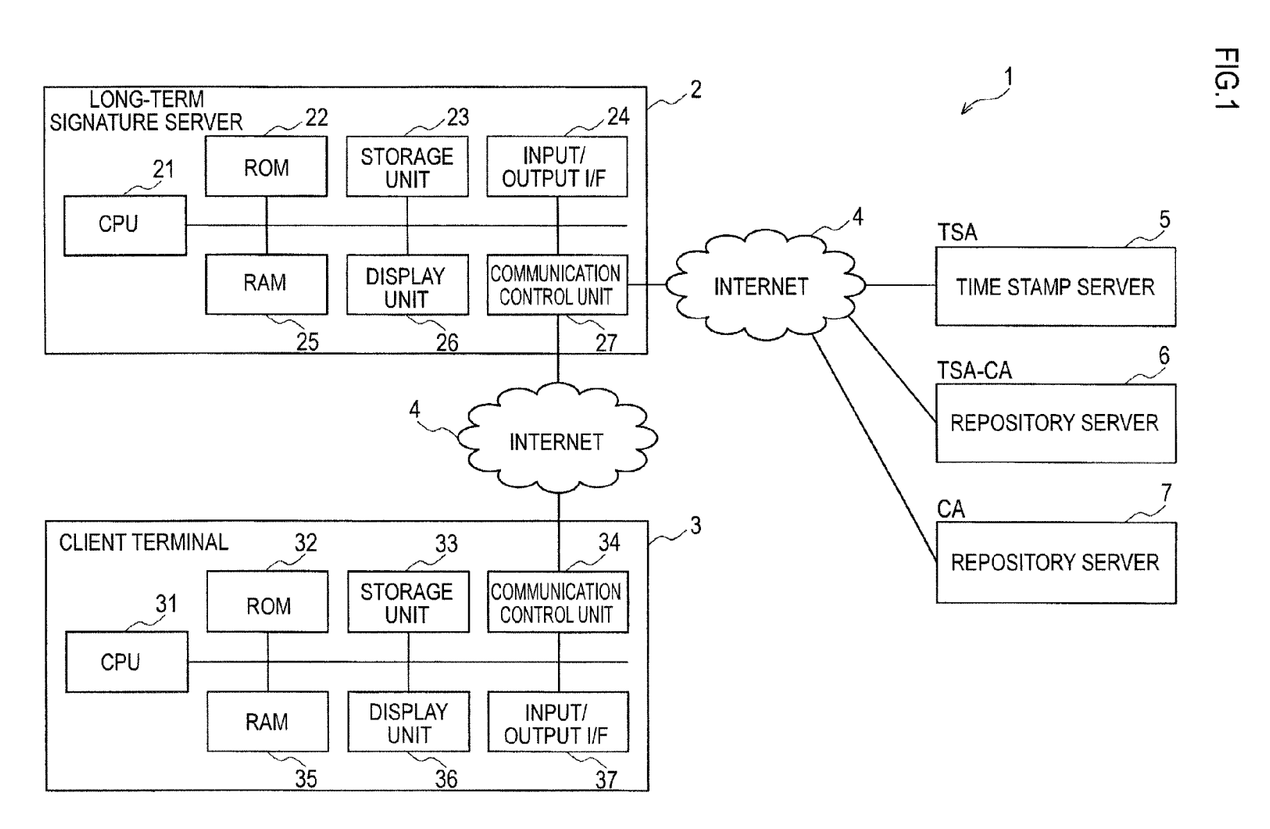
FIG. 1 is a diagram illustrating the configuration of a long-term signature system.

FIG. 1 is a diagram illustrating the configuration of a long-term signature system 1.

The long-term signature system 1 has a configuration in which a long-term signature server 2, a client terminal 3, a time stamp server 5, repository servers 6 and 7, and the like are connected to be communicable with each other through Internet 4.

The long-term signature server 2 has a central processing unit (CPU) 21, a read only memory (ROM) 22, a storage unit 23, an input/output I/F 24, a random access memory (RAM) 25, a display unit 26, a communication control unit 27, and the like.

The CPU 21 is a central processing unit which performs information processing or performs control of the respective units of the long-term signature server 2 according to a program stored in the storage unit 23 or the like.

In this embodiment, the CPU 21 supports the creation of long-term signature data in the client terminal 3 while performing communication with the client terminal 3, the time stamp server 5, or the repository servers 6 and 7.

The ROM 22 is a read only memory and stores a basic program which is used to operate the long-term signature server 2, parameters, and the like.

The RAM 25 is a readable and writable memory and provides a work memory or the like which is used when the long-term signature server 2 performs communication with the client terminal 3 or the like to create long-term signature data.

The storage unit 23 is constituted by, for example, a high-capacity storage device, such as a hard disk, and stores an operating system (OS) which is used to operate the long-term signature server 2, a program which is used to support the generation of long-term signature data, or the like.

The display unit 26 includes a display device using, for example, liquid crystal, a cathode ray tube (CRT), or the like and displays various screens which are used when a person in charge of operation of the long-term signature server 2 operates the long-term signature server 2.

The input/output I/F 24 includes an input/output device, for example, various operating switches, a keyboard, a mouse, and the like, and the person in charge of operation or the like can operate the long-term signature server 2 from the input/output I/F 24.

The communication control unit 27 performs communication with the client terminal 3, the time stamp server 5, the repository servers 6 and 7, and the like through Internet 4. Internet 4 may be a different form of communication network.

The long-term signature server 2 can receive data requiring a time stamp, such as CAdES-BES described below, from the client terminal 3, can transmit data to the time stamp server 5 to apply the time stamp, and can return data with the time stamp applied thereto to the client terminal 3 using the communication control unit 27. The long-term signature server can also collect information, such as verification information, necessary when the client terminal 3 creates PDF advanced electronic signatures (PAdES) (long-term signature data of a portable document format (PDF)) from the repository servers 6 and 7 and can transmit the information to the client terminal 3 using the communication control unit 27.

The client terminal 3 has a CPU 31, a ROM 32, a storage unit 33, a communication control unit 34, a RAM 35, a display unit 36, an input/output I/F 37, and the like.

The CPU 31 is a central processing unit which performs information processing or performs control of the respective units of the client terminal 3 according to a program stored in the storage unit 33 or the like.

In this embodiment, the CPU 31 performs transmission and reception of various kinds of information with respect to the long-term signature server 2, an electronic signature with secret key, and the like, and generates PAdES.

The ROM 32 is a read only memory and stores a basic program which is used to operate the client terminal 3, parameters, and the like.

The RAM 35 is a readable and writable memory and provides a work memory when the client terminal 3 generates PAdES while performing communication with the long-term signature server 2.

The storage unit 33 is constituted by, for example, a high-capacity storage device, such as a hard disk, and stores an OS which is used to operate the client terminal 3, a secret key which is used to perform an electronic signature, a public key certificate of a public key corresponding to the secret key, a PDF document as original data to be subjected to a long-term signature, or the like.

A program which is used when the client terminal 3 creates PAdES may be downloaded from the long-term signature server 2 each time of creating PAdES or may be stored in the storage unit 33 in advance and used.

The display unit 36 includes a display device using, for example, liquid crystal, a CRT, or the like and displays various screens which are used when the user of the client terminal 3 operates the client terminal 3.

The input/output I/F 37 includes an input/output device, such as a keyboard, a mouse, and an IC card reader/writer.

The IC card reader/writer is connected to an IC card and mediates communication between the client terminal 3 and the IC card.

The IC card is an information processing device including a CPU, a ROM, a RAM, an electrically erasable and programmable ROM (EEPROM), and the like and stores user authentication information for authenticating the user who uses the client terminal 3, or the like.

The secret key or the public key certificate may be stored in the IC card, and the client terminal 3 may perform an electronic signature using the secret key of the IC card.

The communication control unit 34 performs communication with the long-term signature server 2 through the Internet 4. Transmission of CAdES-BES to the long-term signature server 2, reception of CAdES-T, reception of verification information, reception of DTS, and the like are performed using the communication control unit 34.

The time stamp server 5 is a server which issues a time stamp, and is provided in a Time Stamping Authority (TSA).

The time stamp server 5 has an accurate timepiece which is corrected by the time to be distributed by a time distribution station, if electronic data for which a time stamp is to be issued is received, appends electronic data with the current date and time by the timepiece, and performs an electronic signature (encryption) with a secret key for a time stamp to issue a time stamp.

The repository server 6 is a server which is provided in a time stamping authority certificate authority (TSA-CA: time stamp certificate authority), and provides expiration information (Certificate Revocation List (CRL)) of a public key certificate (a public key certificate of a public key corresponding to a secret key used in a time stamp) for use in verification of the time stamp.

Since a public key certificate which is not listed up in the expiration information is not expired, it is thus possible to confirm the validity of the public key certificate and to confirm the validity of a time stamp by the valid public key certificate.

The repository server 7 is a server which is provided in a certificate authority (CA), and provides expiration information of a public key certificate for use in verification of an electronic signature performed by the client terminal 3 (a public key certificate of a public key corresponding to a secret key of the client terminal 3).

Since a public key certificate which is not listed up in the expiration information is not expired, it is thus possible to confirm the validity of the public key certificate and to confirm the validity of the electronic signature performed by the client terminal 3 by the valid public key certificate.

The expiration information which is provided by the repository server 6 and the repository server 7 is updated regularly or irregularly (for example, every 24 hours).

When a long-term signature is performed without a mechanism of a long-term signature in the client terminal 3, the long-term signature server 2 should be entrusted with confidential information, such as original data or a secret key for an electronic signature. Meanwhile, in the long-term signature system 1, the roles of the client terminal 3 and the long-term signature server 2 are divided, and long-term signature processing is performed in a cooperation manner by client-to-server communication, it is possible to perform the long-term signature while retaining the confidential information in the client terminal 3 without sending the confidential information to the outside.

When the long-term signature is performed only by the client terminal 3, the client terminal 3 should perform collection of the public key certificate and expiration information, management of connection to the time stamp server 5, and the like in a self manner, and operation becomes complicated. Meanwhile, in the long-term signature system 1, since these complicated procedures are executed by the long-term signature server 2, the connection destination of the client terminal 3 can be concentrated to the long-term signature server 2.

Figure 2:
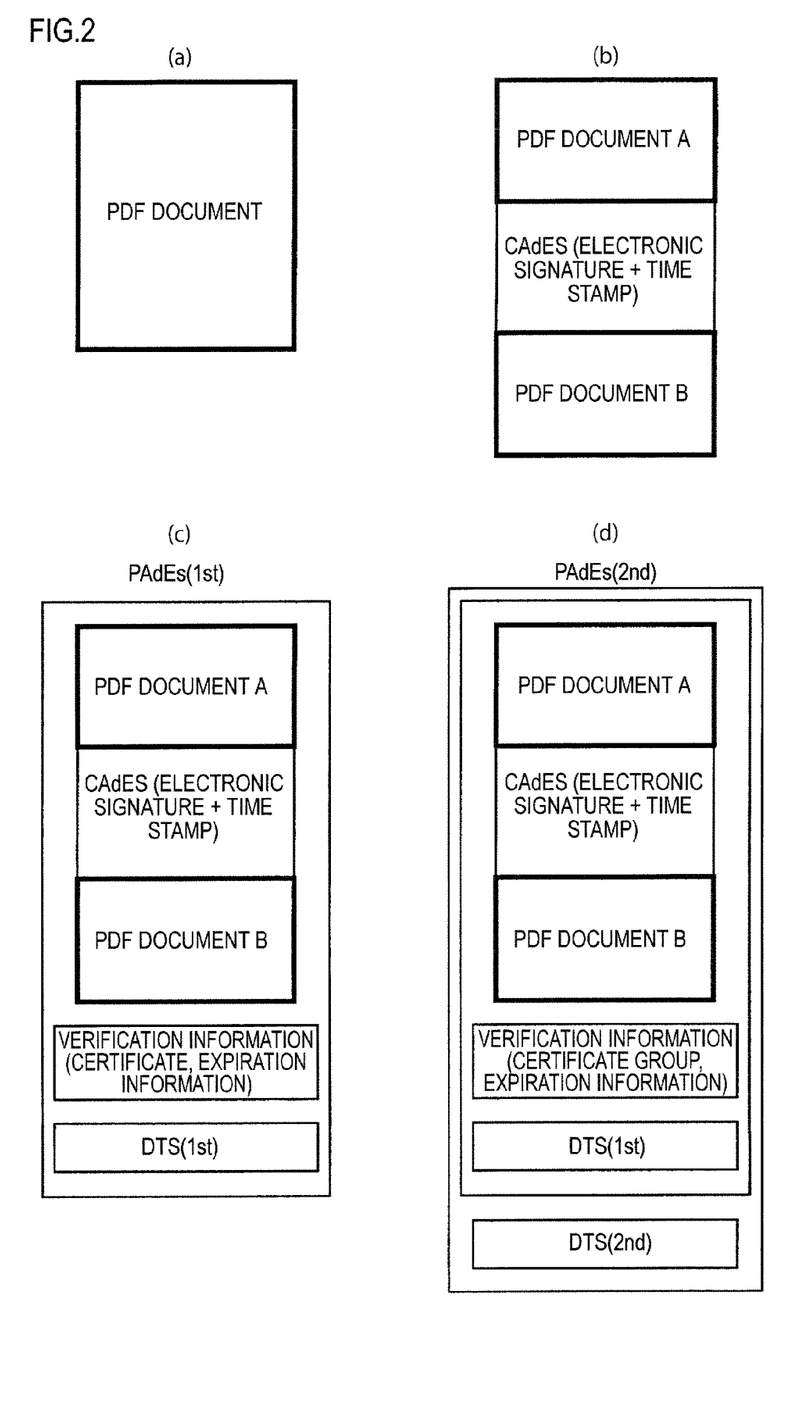
FIG. 2 is a diagram illustrating a format of long-term signature data.

FIG. 2 is a diagram illustrating a format of long-term signature data which is used in the long-term signature system 1.

In this embodiment, PAdES which is a format long-term signature data specified for a PDF file is used in a long-term signature.

This is not intended to limit original data or the long-term signature format to PDF or PAdES, and the invention may be applied to other kinds of original data or long-term signature formats.

PAdES is the concept of an electronic signature which is created by European Telecommunications Standards Institute (ETSI), widely recognized in European Union, and suitable for an application including a human-readable document, and supplements the concept of two other electronic signatures, CAdES or XML advanced electronic signatures (XAdES), which are suitable for an application not including a human-readable document.

FIG. 2(*a*) is a diagram showing a PDF document (PDF file) to be stored. In the PDF document, document data (hereinafter, referred to as a PDF document) in a PDF format is recorded.

A PDF document refers to an arbitrary document which is created by the user in a PDF format, for example, a proposal, a report, a specification, or the like.

FIG. 2(*b*) is a diagram showing a case where an electronic signature by CMS advanced electronic signatures (CAdES) is applied to a PDF document.

Here, CAdES is an advanced electronic signature format in which a time stamp is appended to an electronic signature, and there are various formats of CAdES-T, CAdES-C, and the like.

When a long-term signature is performed with PAdES, CAdES-T in which a time stamp is applied to an electronic signature is used.

When creating PAdES from a PDF document, a preliminary step in which the PDF document is divided into two PDF documents A and B, and CAdES is combined between the PDF documents A and B is specified. The division location is recorded in tag information of CAdES.

Hereinafter, a PDF document shown in FIG. 2(*b*) in which an electronic signature is appended by combining CAdES between the PDF documents A and B is referred to as a signed PDF document.

Although in this embodiment, the PDF document is divided and CAdES is inserted between the divided PDF documents, CAdES may be combined with the end or head of original data without dividing original data.

FIG. 2(*c*) is a diagram showing a case where PAdES is generated from a signed PDF document.

The format of long-term signature data is based on the first generation and shown as PAdES (1st).

PAdES is constituted by applying verification information and a document time stamp (DTS) to a signed PDF document. Here, since the first-generation DTS is applied, DTS (1st) is shown.

The verification information includes a public key certificate corresponding to a secret key used for the electronic signature or the time stamp and expiration information (a list of expired public key certificates) of public key certificates.

If it is confirmed that the public key certificate corresponding to the secret key used for the electronic signature of the user or the time stamp is not included in the expiration information, it can be confirmed that the secret key is valid, thereby verifying the legitimacy of CAdES.

DTS (1st) is the time stamp which is issued for information (for example, the hash values of the signed PDF document and the expiration information) for verifying unfalsification of the signed PDF document and the expiration information.

DTS (1st) has an expiration date longer than the electronic signature of the user or the time stamp by CAdES, and is issued within the expiration date of the electronic signature of the user or the time stamp.

For example, within the expiration date of DTS (1st), even if the expiration date of the electronic signature or the time stamp of CAdES has elapsed or validity is lost within the expiration date, it is possible to secure unfalsification of the signed PDF document and the expiration information by DTS (1st).

That is, if DTS (1st) is valid, it is possible to confirm unfalsification of the signed PDF document and the verification information. If unfalsification is confirmed, it is possible to verify CAdES by the verification information regardless of the expiration date of the electronic signature and the time stamp of CAdES. If unfalsification of CAdES can be verified, it is possible to confirm unfalsification of the PDF document using CAdES.

Although a case where DTS is added inside CAdES is considered, if DTS is added outside the signed PDF document, it is possible to avoid a situation in which DTS does not fall within the secured capacity of CAdES since the capacity of CAdES is secured in advance in the PDF signature, and DTS is repeated through successive generations.

FIG. 2(*d*) is a diagram showing a case where the expiration date of a long-term signature is extended by the second-generation PAdES. In the drawing, the second-generation PAdES is shown as PAdES (2nd).

PAdES (2nd) is constituted by applying DTS (2nd) to PAdES (1st).

DTS (2nd) is the second-generation document time stamp, and is the time stamp which is issued for information (for example, the hash value of PAdES (1st)) for verifying unfalsification of PAdES (1st).

DTS (2nd) has an expiration date longer than the expiration date of DTS (1st), and is issued for PAdES (1st) before the expiration date of DTS (1st) elapses.

For example, even when the expiration date of DTS (1st) has elapsed, or validity is lost within the expiration date, if DTS (2nd) is valid, it is possible to secure unfalsification of PAdES (1st).

Though not shown, the generations of PAdES can be further repeated to the third generation, the fourth generation, . . . .

In this way, in PAdES, before the latest DTS becomes invalid, DTS having an expiration date longer than the latest DTS is added and repeated through successive generations, thereby sequentially extending the expiration date of PAdES.

Figure 3:
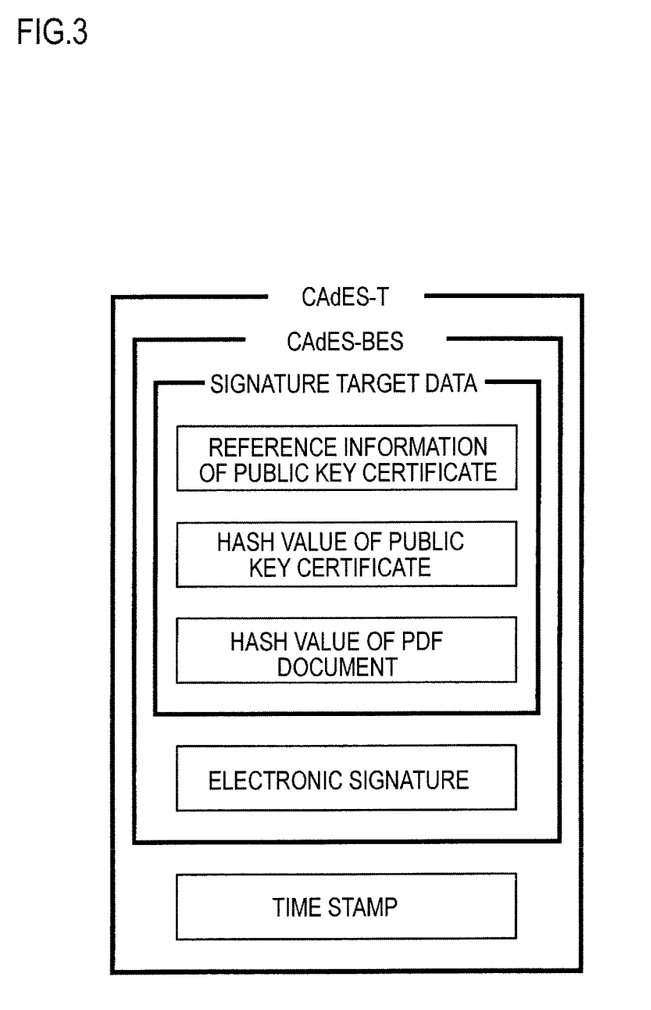
FIG. 3 is a diagram illustrating the configuration of CAdES.

FIG. 3 is a diagram illustrating the configuration of CAdES. In this embodiment, from among various kinds of CAdES, CAdES-T is used.

CAdES-T is constituted using CAdES-BES and a time stamp.

CAdES-BES includes signature target data including reference information of a public key certificate corresponding to a secret key for use in an electronic signature by the user, the hash value of the public key certificate, and the hash value of the PDF document, and an electronic signature in which signature target data is signed with the secret key of the user.

The time stamp is issued by the time stamp server 5 for CAdES-BES.

If unfalsification of DTS (FIG. 2(c)) can be verified, a verifier can confirm unfalsification of CAdES-BES by the time stamp.

If unfalsification of CAdES-BES can be confirmed, the verifier can confirm unfalsification of signature target data by the electronic signature, and can confirm that the hash value of the PDF document included in signature target data matches the hash value of the PDF document to be verified, thereby unfalsification of the PDF document to be verified.

Figure 4:
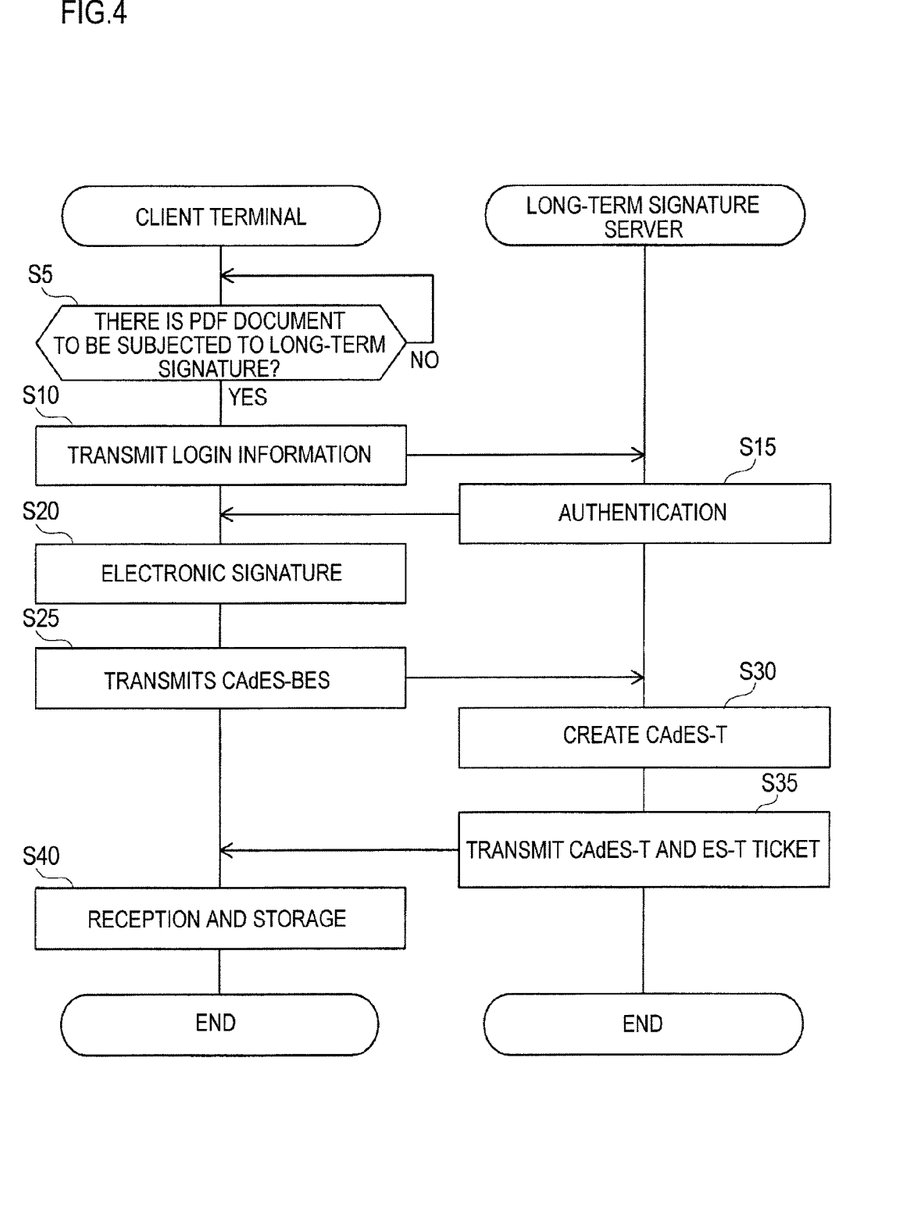
FIG. 4 is a flow illustrating a procedure for generating PAdES by a long-term signature system.

FIG. 4 is a flowchart illustrating a procedure until CAdES-T is generated in a procedure for generating PAdES in the long-term signature system 1.

The following processing is performed by the CPU 31 of the client terminal 3 and the CPU 21 of the long-term signature server 2 according to a predetermined program.

The client terminal 3 monitors whether or not a PDF document is stored in a directory (folder) in which a PDF document to be subjected to a long-term signature is stored (Step 5). When a PDF document is not stored (Step 5; N), monitoring continues. When a PDF document is stored (Step 5; Y), login information, such as a user name and a password, is transmitted to the long-term signature server 2 (Step 10).

In regard to the transmission of the login information, the login information may be stored in the client terminal 3 in advance and automatically transmitted, or a login screen may be displayed on the display unit 36, the user may input the login information, and the login information may be transmitted.

If the login information is received from the client terminal 3, the long-term signature server 2 authenticates the user using the login information to perform login processing, and transmits the effect of the completion of the login processing to the client terminal 3 (Step 15).

If the login processing is completed, the client terminal 3 computes the hash value of the PDF document stored in the directory or the like to create signature target data, and performs an electronic signature with the own secret key to create CAdES-BES (Step 20). An electronic signature which has been already made may be acquired.

The client terminal 3 transmits CAdES-BES to the long-term signature server 2 (Step 25).

If CAdES-BES is received from the client terminal 3, the long-term signature server 2 transmits a time stamp request for CAdES-BES to the time stamp server 5.

For example, this request is made by computing the hash value of the signature value in CAdES-BES and transmitting the hash value to the long-term signature server 2, or the like.

If the time stamp request for CAdES-BES is received from the long-term signature server 2, the time stamp server 5 issues a time stamp and transmits the time stamp to the long-term signature server 2.

The long-term signature server 2 receives the time stamp from the time stamp server 5 and creates CAdES-T from the time stamp and CAdES-BES (Step 30).

The long-term signature server 2 also creates an ES-T ticket and transmits CAdES-T and the ES-T ticket to the client terminal 3 (Step 35).

Here, the ES-T ticket is information for designating the time at which the client terminal 3 starts the following processing, and also includes information for specifying the processed CAdES-T, or the like.

If CAdES-T and the ES-T ticket are received from the long-term signature server 2, the client terminal 3 stores CAdES-T and the ES-T ticket in a predetermined directory (Step 40), and pauses PAdES generation processing to the time designated by the ES-T ticket. The pause period is, for example, about one day.

In this way, the pause period is provided to get the time until the expiration information to be provided by the repository servers 6 and 7 is updated to the latest information. That is, when CAdES-BES is received from the client terminal 3, it is possible to avoid a situation in which the expiration information or the like is not updated even though the public key certificate is expired intrinsically.

Figure 5:
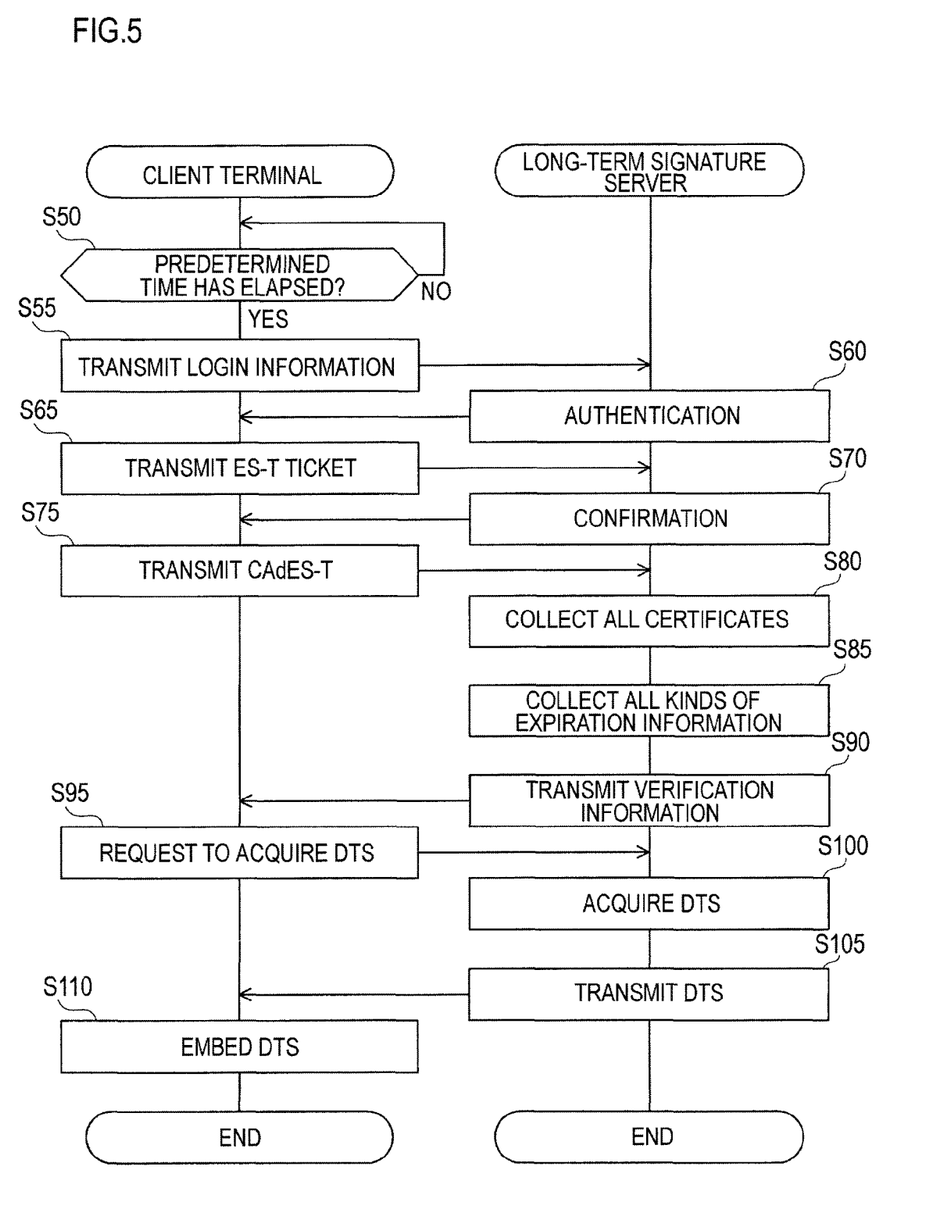
FIG. 5 is a flow illustrating the continuation of the procedure for generating PAdES by the long-term signature system.

FIG. 5 is a flowchart illustrating a procedure after CAdES-T is generated in a procedure for generating PAdES in the long-term signature system 1.

First, before the procedure starts, the long-term signature server 2 accesses the repository servers 6 and 7 regularly and caches expiration information in a predetermined directory regularly.

The client terminal 3 monitors whether or not a predetermined time designated by the ES-T ticket has elapsed (Step 50). When the predetermined time has not elapsed (Step 50; N), monitoring continues.

When the predetermined time has elapsed (Step 50; Y), the client terminal 3 transmits the login information to the long-term signature server 2 (Step 55).

If the login information is received from the client terminal 3, the long-term signature server 2 authenticates the user using the login information to perform login processing, and transmits the effect of the completion of the login processing to the client terminal 3 (Step 60).

If the effect of the completion of the login processing is received from the long-term signature server 2, the client terminal 3 transmits the stored ES-T ticket to the long-term signature server 2 (Step 65).

If the ES-T ticket is received from the client terminal 3, the long-term signature server 2 confirms the ES-T ticket, and recognizes CAdES-T for which the client terminal 3 proceeds processing. The long-term signature server 2 notifies the client terminal 3 of the effect of the confirmation of the ES-T ticket (Step 70).

If the notification is received from the long-term signature server 2, the client terminal 3 transmits CAdES-T (Step 75).

If CAdES-T is received from the client terminal 3, the long-term signature server 2 collects all public key certificates necessary for verifying CAdES-T (Step 80).

Next, the long-term signature server 2 collects all kinds of expiration information of all public key certificates necessary for verifying CAdES-T from the directory in which the expiration information is cached (Step 85).

Next, the long-term signature server 2 generates verification information from the collected public key certificates and expiration information, and transmits the verification information to the client terminal 3 (Step 90).

If the verification information is received from the long-term signature server 2, the client terminal 3 generates information necessary for acquiring DTS (here, DTS (1st) since DTS is the first generation), and transmits the information to the long-term signature server 2 to request to acquire DTS (Step 95).

Here, the information (hereinafter, referred to as DTS creation information) necessary for acquiring DTS is information in which unfalsification of the PDF document, the signed PDF document, and the verification information can be confirmed, and for example, the hash value of information including the PDF document, CAdES-T, the verification information, or the like may be used.

If the DTS creation information is received, the long-term signature server 2 transmits a time stamp request of the DTS creation information to the time stamp server 5, issues a time stamp, and acquires DTS (Step 100).

For example, the time stamp request is made by transmitting the hash value of the DTS creation information to the long-term signature server 2, or the like, and the acquisition of DTS is performed by applying the time stamp received from the time stamp server 5 to the DTS creation information.

The long-term signature server 2 transmits DTS to the client terminal 3 (Step 105).

The client terminal 3 receives DTS from the long-term signature server 2 and embeds DTS in data having the signed PDF document and the verification information to generate PAdES (Step 110).

With the embodiment described above, the following effects can be obtained.

(1) The client terminal 3 can generate PAdES without sending confidential information, such as a secret key for use in an electronic signature or a PDF document, to the outside.

(2) The client terminal 3 does not need to access the time stamp server 5 and the repository servers 6 and 7 individually, and only accesses the long-term signature server 2 to generate PAdES.

(3) Even when there is a change in access information, such as the uniform resource locators (URLs) of the time stamp server 5 and the repository servers 6 and 7, the long-term signature server 2 copes with the change, and the client terminal 3 does not need to reset the access information.

(4) Since the long-term signature server 2 performs the complicated management of identification documents, the management may not be performed on the client terminal 3 side.

(5) Since the communication of the client terminal 3 relating to a long-term signature is performed only with the long-term signature server 2, the setting of network security is simplified.

(6) The long-term signature server 2 can perform collection of verification information, acquisition of a time stamp, and certificate management.

(7) The long-term signature processing can be appropriately distributed to a client side and a server side, and thus, the operation management of a public key certificate or a time stamp is performed on the server side, thereby reducing the burden on the user.

Although in the long-term signature system 1 described above, the access target of the client terminal 3 is only the long-term signature server 2, the client terminal 3 may access the time stamp server 5 and the repository servers 6 and 7 individually to generate PAdES, instead of accessing the long-term signature server 2.

With the long-term signature system 1 described above, the following configuration can be obtained. In order to store a PDF document in a predetermined folder, the client terminal 3 includes storage-target data acquisition means for acquiring storage-target data (PDF document).

In order to perform an electronic signature on a PDF document with the own secret key to generate CAdES-BES, the client terminal 3 includes electronic signature data acquisition means for acquiring electronic signature data (CAdES-BES) of the acquired storage-target data.

In order to transmit CAdES-BES to the long-term signature server 2 and to receive CAdES-T from the long-term signature server 2, the client terminal 3 includes electronic signature data reception means for transmitting the acquired electronic signature data to a predetermined server (long-term signature server 2) and receiving electronic signature data (CAdES-T) with a time stamp applied thereto from the predetermined server.

In order to divide a PDF document and to combine CAdES-T between the divided PDF documents to generate a signed PDF document, the client terminal 3 includes signed data generation means for combining the received electronic signature data with the time stamp applied thereto with the acquired storage-target data to generate signed data (signed PDF document).

In order to receive verification information from the long-term signature server 2 and to generate data having the signed PDF document and the verification information, the client terminal 3 includes long-term signature data generation means for receiving verification information for verifying the validity of the electronic signature data with the time stamp applied thereto from a predetermined server (long-term signature server 2), applying the verification information to the signed data, and generating first long-term signature data (data having the signed PDF document and the verification information).

In order to transmit DTS creation information for confirming unfalsification of the signed PDF document and the verification information to the long-term signature server 2 to generate DTS, the client terminal 3 includes confirmation data reception means for generating confirmation data (DTS creation information) for confirming unfalsification of the generated long-term signature data, transmitting the confirmation data to a predetermined server (long-term signature server 2), and receiving the confirmation data (DTS) with a time stamp applied thereto from the predetermined server.

In order to apply DTS to the signed PDF document and the verification information to generate PAdES, the client terminal 3 includes long-term signature data generation means for applying the received confirmation data having the time stamp applied thereto to the first long-term signature data to generate second long-term signature data.

In order to divide a PDF document into two PDF documents A and B, the client terminal 3 includes division means for dividing the acquired storage-target data into first data (PDF document A) and second data (PDF document B).

In order to insert and combine CAdES between the PDF documents A and B to generate the signed PDF document, in the client terminal 3, the signed data generation means combines the acquired electronic signature data between the first data and the second data.

In order to access the long-term signature server 2 to perform all kinds of processing, in the client terminal 3, at least two of the electronic signature data reception means, the long-term signature data generation means, and the confirmation data reception means perform communication with the same server (long-term signature server 2).

In order to receive CAdES-BES from the client terminal 3, to transmit a time stamp request of CAdES-BES to the time stamp server 5, and if a time stamp is issued by the time stamp server 5, to transmit CAdES-T to the client terminal 3, the long-term signature server 2 includes electronic signature data time stamp request means for receiving electronic signature data (CAdES-BES) from a long-term signature terminal (client terminal 3) generating long-term signature data for storage-target data and transmitting a time stamp request of the electronic signature data to a time stamp server, and electronic signature data transmission means for receiving a time stamp transmitted from the time stamp server for the time stamp request of the electronic signature data, applying the received time stamp to the electronic signature data, and transmitting the electronic signature data with the time stamp applied thereto to the long-term signature terminal as CAdES-T.

In order to collect expiration information necessary for verifying CAdES-T from the repository servers 6 and 7, to generate verification information, and to transmit the verification information to the client terminal 3, the long-term signature server 2 includes verification information transmission means for collecting verification information for verifying the validity of the electronic signature data having the time stamp applied thereto and transmitting the verification information to the long-term signature terminal.

In order to receives DTS creation information for confirming unfalsification of original data, the signed PDF document, and the verification information from the client terminal 3, and to transmit a time stamp request of the DTS creation information to the time stamp server 5, the long-term signature server 2 includes confirmation data time stamp request means for receiving confirmation data for confirming unfalsification of long-term signature data generated by the long-term signature terminal using the storage-target data, the electronic signature data having the time stamp applied thereto, and the transmitted verification information from the long-term signature terminal and transmitting a time stamp request of the confirmation data to a time stamp server.

In order to cause the time stamp server 5 to issue a time stamp, to generate DTS, and to transmit DTS to the client terminal 3, the long-term signature server 2 includes confirmation data transmission means for receiving a time stamp transmitted from the time stamp server for the time stamp request of the confirmation data, applying the received time stamp to the confirmation data, and transmitting the confirmation data with the time stamp applied thereto to the long-term signature terminal as DTS.

In order to generate CAdES, the client terminal 3 executes a long-term signature terminal program which causes a computer to realize a storage-target data acquisition function of acquiring storage-target data, an electronic signature data acquisition function of acquiring electronic signature data of the acquired storage-target data, an electronic signature data reception function of transmitting the acquired electronic signature data to a predetermined server and receiving electronic signature data having a time stamp applied thereto from the predetermined server, a signed data generation function of combining the received electronic signature data having the time stamp applied thereto with the acquired storage-target data to generate signed data, a long-term signature data generation function of receiving the electronic signature data and verification information for verifying the validity of the time stamp from a predetermined server to apply the verification information to the signed data and generating long-term signature data, a confirmation data reception function of generating confirmation data for confirming unfalsification of the generated long-term signature data, transmitting the confirmation data to a predetermined server, and receiving the confirmation data having a time stamp applied thereto from the predetermined server, and a long-term signature data generation function of applying the received confirmation data having the time stamp applied thereto to the long-term signature data to generate long-term signature data.

The long-term signature server 2 executes a long-term signature server program which causes a computer to realize an electronic signature data time stamp request function of receiving electronic signature data from a long-term signature terminal generating long-term signature data for storage-target data and transmitting a time stamp request of the electronic signature data to a time stamp server, an electronic signature data transmission function of receiving a time stamp transmitted from the time stamp server for the time stamp request of the electronic signature data and applying the received time stamp to the electronic signature data to transmit the long-term signature terminal, a verification information transmission function of collecting verification information for verifying the validity of the electronic signature data having the time stamp applied thereto and transmitting the verification information to the long-term signature terminal, a confirmation data time stamp request function of receiving confirmation data for confirming unfalsification of long-term signature data by the long-term signature terminal using the storage-target data, the electronic signature data having the time stamp applied thereto, and the transmitted verification information from the long-term signature terminal and transmitting a time stamp request of the confirmation data to a time stamp server, and a confirmation data transmission function of receiving a time stamp transmitted from the time stamp server for the time stamp request of the confirmation data, applying the received time stamp to the confirmation data, and transmitting the confirmation data having the time stamp applied thereto to the long-term signature terminal.

REFERENCE SIGNS LIST

1: long-term signature system
2: long-term signature server
3: client terminal
4: Internet
5: time stamp server
6: repository server
7: repository server

The invention claimed is:

1. A long-term signature terminal comprising:
   a storage-target data acquisition circuit for acquiring storage-target data;
   an electronic signature data acquisition circuit for acquiring electronic signature data of the acquired storage-target data;
   an electronic signature data reception circuit for transmitting the acquired electronic signature data to a predetermined server and receiving electronic signature data having a time stamp applied thereto from the predetermined server;
   a signed data generation circuit for combining the received electronic signature data having the time stamp applied thereto with the acquired storage-target data to generate signed data;
   a long-term signature data generation circuit for receiving verification information for verifying the validity of the electronic signature data having the time stamp applied thereto from a predetermined server, applying the verification information to the signed data, and generating first long-term signature data;
   a confirmation data reception circuit for generating confirmation data for confirming unfalsification of the generated long-term signature data, transmitting the confirmation data to a predetermined server, and receiving the confirmation data having a time stamp applied thereto from the predetermined server; and
   a long-term signature data generation circuit for applying the received confirmation data having the time stamp applied thereto to the first long-term signature data to generate second long-term signature data;
   wherein at least two of the electronic signature data reception circuit, the long-term signature data generation circuit, and the confirmation data reception circuit perform communication with the same server.

2. The long-term signature terminal according to claim 1, further comprising a division circuit for dividing the acquired storage-target data into first data and second data; wherein the signed data generation circuit combines the acquired electronic signature data between the first data and the second data.

3. A long-term signature server connected in communication with a long-term signature terminal according to claim 1, the long-term signature server comprising:
   an electronic signature data time stamp request circuit for receiving electronic signature data from a long-term signature terminal that generates long-term signature data for storage-target data and for transmitting a time stamp request of the electronic signature data to a time stamp server;
   an electronic signature data transmission circuit for receiving a time stamp transmitted from the time stamp server for the time stamp request of the electronic signature data, applying the received time stamp to the electronic signature data, and transmitting the electronic signature data having the time stamp applied thereto to the long-term signature terminal;
   a verification information transmission circuit for collecting verification information for verifying the validity of the electronic signature data having the time stamp applied thereto and transmitting the verification information to the long-term signature terminal;
   a confirmation data time stamp request circuit for receiving confirmation data for confirming unfalsification of long-term signature data generated by the long-term signature terminal using the storage-target data, of the electronic signature data having the time stamp applied thereto, and of the transmitted verification information from the long-term signature terminal, and for transmitting a time stamp request of the confirmation data to a time stamp server; and
   a confirmation data transmission circuit for receiving a time stamp transmitted from the time stamp server for the time stamp request of the confirmation data, applying the received time stamp to the confirmation data, and transmitting the confirmation data having the time stamp applied thereto to the long-term signature terminal.

4. A non-transitory computer-readable storage medium having a long-term signature terminal program stored therein, the long-term signature terminal program, when executed, causing a computer to realize:
   a storage-target data acquisition function of acquiring storage-target data;
   an electronic signature data acquisition function of acquiring electronic signature data of the acquired storage-target data;
   an electronic signature data reception function of transmitting the acquired electronic signature data to a predetermined server and receiving electronic signature data having a time stamp applied thereto from the predetermined server;
   a signed data generation function of combining the received electronic signature data having the time stamp applied thereto with the acquired storage-target data to generate signed data;
   a long-term signature data generation function of receiving verification information for verifying the validity of the electronic signature data having the time stamp applied thereto from a predetermined server, applying the verification information to the signed data, and generating first long-term signature data;
   a confirmation data reception function of generating confirmation data for confirming unfalsification of the generated long-term signature data, transmitting the confirmation data to a predetermined server, and receiving the confirmation data having a time stamp applied thereto from the predetermined server; and
   a long-term signature data generation function of applying the received confirmation data having the time stamp applied thereto to the long-term signature data to generate second long-term signature data;
   wherein at least two of the electronic signature data acquisition function, long-term signature data generation function, and confirmation data reception function involves communication with the same server.

5. A non-transitory computer-readable storage medium having a long-term signature server program stored therein, the long-term signature terminal program, when executed, causing a computer to realize:
   an electronic signature data time stamp request function of receiving electronic signature data from a long-term signature terminal that generates long-term signature data for storage-target data and for transmitting a time stamp request of the electronic signature data to a time stamp server;
   an electronic signature data transmission function of receiving a time stamp transmitted from the time stamp server for the time stamp request of the electronic signature data, applying the received time stamp to the electronic signature data, and transmitting the electronic signature data having the time stamp applied thereto to the long-term signature terminal;

a verification information transmission function of collecting verification information for verifying the validity of the electronic signature data having the time stamp applied thereto and transmitting the verification information to the long-term signature terminal;

a confirmation data time stamp request function of receiving confirmation data for confirming unfalsification of long-term signature data generated by the long-term signature terminal using the storage-target data, of the electronic signature data having the time stamp applied thereto, and of the transmitted verification information from the long-term signature terminal, and for transmitting a time stamp request of the confirmation data to a time stamp server; and a confirmation data transmission function of receiving a time stamp transmitted from the time stamp server for the time stamp request of the confirmation data, applying the received time stamp to the confirmation data, and transmitting the confirmation data having the time stamp applied thereto to the long-term signature terminal;

wherein at least two of the electronic signature data transmission function, the verification information transmission function, and the confirmation data time stamp request function are performed by communication with the same server.

* * * * *